(12) United States Patent
Sicron et al.

(10) Patent No.: US 11,599,379 B1
(45) Date of Patent: *Mar. 7, 2023

(54) METHODS AND SYSTEMS FOR TRACKING A VIRTUAL MEMORY OF A VIRTUAL MACHINE

(71) Applicant: MARVELL ASIA PTE, LTD., Singapore (SG)

(72) Inventors: Merav Sicron, Kfar-Saba (IL); Rafi Shalom, Petah Tikva (IL)

(73) Assignee: MARVELL ASIA PTE, LTD, Singapore (SG)

( * ) Notice: Subject to any disclaimer, the term of this patent is extended or adjusted under 35 U.S.C. 154(b) by 264 days.

This patent is subject to a terminal disclaimer.

(21) Appl. No.: 17/177,878

(22) Filed: Feb. 17, 2021

Related U.S. Application Data

(63) Continuation of application No. 16/779,284, filed on Jan. 31, 2020, now Pat. No. 10,956,202, which is a continuation of application No. 15/912,336, filed on Mar. 5, 2018, now Pat. No. 10,592,271.

(51) Int. Cl.
*G06F 9/455* (2018.01)
*G06F 3/06* (2006.01)

(52) U.S. Cl.
CPC ........ *G06F 9/45558* (2013.01); *G06F 3/0647* (2013.01); *G06F 3/0664* (2013.01); *G06F 2009/4557* (2013.01); *G06F 2009/45583* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 6,408,313 | B1 | 6/2002 | Campbell et al. |
| 7,603,562 | B2 | 10/2009 | Flynn |
| 7,620,057 | B1 | 11/2009 | Aloni et al. |
| 8,156,301 | B1 * | 4/2012 | Khandelwal ........ G06F 11/2097 711/146 |
| 8,417,885 | B2 | 4/2013 | Chou et al. |
| 8,621,496 | B2 | 12/2013 | Madampath |
| 9,104,459 | B2 * | 8/2015 | Tsirkin ................ G06F 9/45558 |
| 9,177,145 | B2 * | 11/2015 | Todorović ............... G06F 21/53 |
| 9,201,612 | B1 | 12/2015 | Vincent |

(Continued)

OTHER PUBLICATIONS

Ye et al. "Energy-Efficient Memory Management in Virtual Machine Environment", 2011 IEEE, 8 pages.*

(Continued)

*Primary Examiner* — Van H Nguyen

(57) ABSTRACT

Methods and systems for a virtual machine environment are provided. One method includes allocating a memory for storing a dirty pages data structure for tracking writes to a virtual machine memory by an adapter coupled to a computing device and shared by a plurality of virtual machines; initiating a tracking operation by the adapter or a virtual function driver to track writes to the virtual memory; providing access to the dirty pages data structure in response to a query command, while the adapter or the virtual function driver tracks writes to the virtual machine memory; and providing a number of dirty pages within the dirty pages data structure and a pointer the dirty pages data structure by the adapter or the virtual function driver.

18 Claims, 7 Drawing Sheets

(56) References Cited

U.S. PATENT DOCUMENTS

| | | | | |
|---|---|---|---|---|
| 9,690,615 | B2* | 6/2017 | Dong | G06F 9/5077 |
| 9,851,918 | B2* | 12/2017 | Tsirkin | G06F 3/0647 |
| 9,898,430 | B2 | 2/2018 | Davda et al. | |
| 10,169,088 | B2 | 1/2019 | Tsirkin | |
| 10,592,271 | B1* | 3/2020 | Sicron | G06F 9/45558 |
| 10,901,627 | B1* | 1/2021 | Bshara | G06F 9/45558 |
| 10,956,202 | B1* | 3/2021 | Sicron | G06F 3/0647 |

OTHER PUBLICATIONS

Lee et al. "Characterizing Virtual Memory Write References for Efficient Page Replacement in NAND Flash Memory", 2009 IEEE, 10 pages.*

Xu, et al., "SRVM: Hypervisor Support for Live Migration with Passthrough SR-IOV Network Devices", VEE, pp. 65-77, Apr. 2-3, 2016.

Seshadri, et al., "Page Overlays: An Enhanced Virtual Memory Framework to Enable Fine-grained Memory Management", ACM, pp. 79-91, 2015.

Kannan, et al., "HeteroOS—OS Design for Heterogeneous Memory Management in Datacenter", ISCA, pp. 521-534, Jun. 24-28, 2017.

Gandhi, et al., "Agile Paging for Efficient Memory Virtualization", IEEE, pp. 80-86, May/Jun. 2017.

Daoud, et al., "Dynamic Trace-based Sampling Algorithm for Memory Usage Tracking of Enterprise Application", 2017 IEEE, 7 pages.

Bodorik et al., "Locking with Different Granularities for Reads and Writes in an MVM System", 1999 IEEE, 10 pages.

Notice of Allowance from USPTO dated Jan. 10, 2020 for related U.S. Appl. No. 15/912,336.

Office Action from USPTO dated Sep. 17, 2020 for related U.S. Appl. No. 16/779,284.

Notice of Allowance from USPTO dated Dec. 11, 2020 for related U.S. Appl. No. 16/779,284.

* cited by examiner

METHODS AND SYSTEMS FOR TRACKING A VIRTUAL MEMORY OF A VIRTUAL MACHINE

CROSS-REFERENCE TO RELATED APPLICATION

This patent application is a continuation of U.S. patent application Ser. No. 16/779,284, filed on Jan. 31, 2020, now U.S. Pat. No. 10,956,202, entitled "METHODS AND SYSTEMS FOR TRACKING A VIRTUAL MEMORY OF A VIRTUAL MACHINE," which is a continuation of U.S. patent application Ser. No. 15/912,336, filed on Mar. 5, 2018, now U.S. Pat. No. 10,592,271, entitled "METHODS AND SYSTEMS FOR TRACKING A VIRTUAL MEMORY OF A VIRTUAL MACHINE," the disclosures of which are incorporated herein by reference in their entirety.

TECHNICAL FIELD

The present invention relates to virtual machines (VMs) in general, and in particular, to tracking write operations for a virtual memory of a VM.

BACKGROUND

VMs are commonly used in virtualized computing environments for executing various computing tasks. Typically, in a virtual machine environment a physical resource is time-shared among a plurality of independently operating, processor executable VMs. Each VM may function as a self-contained platform, running its own operating system (OS) and computer executable, application software. The computer executable instructions running in a VM may be collectively referred to as "guest software." In addition, resources available within the VM may be referred to herein as "guest resources." The guest software expects to operate as if it were running on a dedicated computer rather than in a VM. That is, the guest software expects to control various events and have access to hardware resources on a physical computing system (may also be referred to as a host platform or host system) which may be referred to herein as "host hardware resources"). The host hardware resource may include one or more network interface cards (NICs) (also referred to as adapters), one or more processors, resources resident on the processors (e.g., control registers, caches and others), memory (instructions residing in memory, e.g., descriptor tables), and other resources (e.g., input/output devices, host attached storage, network attached storage or others) that reside in a physical machine or are coupled to the host system.

Typically, VMs are executed within a computing device and managed by a virtual machine monitor (VMM), for example, a processor executable, Hypervisor layer provided by VMWare Inc. (without derogation of any trademark rights), a processor executable, Hyper-V layer provided by Microsoft Corp. (without derogation of any trademark rights) and others. A VM may be migrated from one host computing system (i.e. a source machine) to another host computing system (i.e. a destination machine). The VM that is migrated may be referred to as source VM, and the VM after migration to the destination machine may be referred to as destination VM, throughout this specification.

To efficiently migrate a source VM from a source machine to a destination machine, the VMM has to be aware of writes to a virtual memory that is being used by the source VM. This is because the VMM has to send a VM-memory snapshot of the source VM to the destination machine when the migration process starts, without quiescing the source VM, and later sending only contents of dirty pages to the destination machine. This reduces VM downtime due to the migration process. Tracking VM memory writes, however, is challenging in a computing environment that uses single root input/output virtualization (SR-IOV) adapters. Continuous efforts are being made for efficiently tracking virtual memory writes for VM migration.

BRIEF DESCRIPTION OF THE DRAWINGS

The various aspects of the present disclosure will now be discussed in detail with an emphasis on highlighting the advantageous features. These novel and non-obvious aspects are shown in the accompanying drawings, which are for illustrative purposes only. These drawings include the following figures, in which like numerals indicate like parts.

DETAILED DESCRIPTION

Figure 1A:
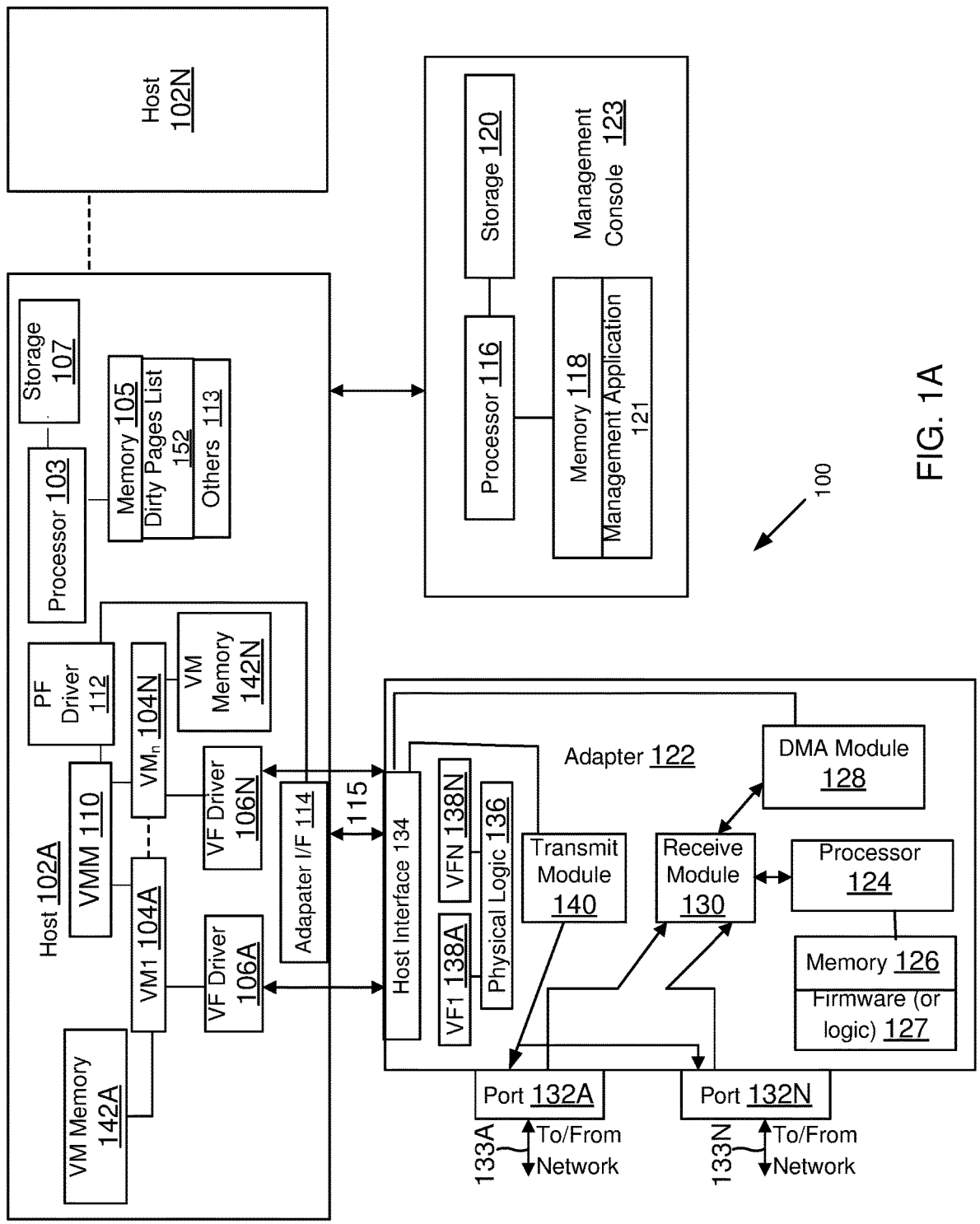
FIG. 1A is a functional block diagram of a system, according to one aspect of the present disclosure.

The following detailed description describes the various aspects of the present disclosure with reference to the drawings. In the drawings, reference numbers label elements of the various aspects. These reference numbers are reproduced below in connection with the discussion of the corresponding drawing features.

As a preliminary note, any of the aspects described with reference to the figures may be implemented using software, firmware, hardware (e.g., fixed logic circuitry), or a combination of these implementations. The terms "logic", "module", "component", "system", and "functionality", as used herein, generally represent software, firmware, hardware, or a combination of these elements. For instance, in the case of a software implementation, the terms "logic", "module", "component", "system", and "functionality" represent program code that performs specified tasks when executed on a hardware processing device or devices (e.g., CPU or CPUs). The program code can be stored in one or more non-transitory computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory, storage medium for retaining information in any form, including various kinds of storage devices (magnetic, optical, static, etc.). The various aspects disclosed herein, may be implemented as a computer process (method), a computing system, or as an article of manufacture, such as a computer program product or computer-readable media. The computer program product may be non-transitory computer storage media, readable by a computer device, and encoding a computer program of instructions for executing a computer process.

System 100: FIG. 1A is a block diagram of a system 100 configured for use with the various aspects of the present disclosure. System 100 may include one or more computing systems 102A/102N (may also be referred to as "host system 102" or "host systems 102" or "computing device (s) 102") each executing a plurality of VMs 104A-104N (may also be referred to as "VM 104" or "VMs 104"). The VMs 104 are provided as stand-alone, virtual computing devices for performing one or more computing functions. Each VM is assigned a virtual memory (may also be referred to as VM memory) 142A-142N (may be referred to as VM memory 142). Each VM executes a virtual function (VF) driver 106A/106N (may be referred to as VF driver 106 or VF drivers 106 and may also be referred to as adapter driver) to access physical hardware resources/logic for transmitting network packets and receiving network packets, as described below in detail.

Host system 102A includes one or more processors 103, also known as central processing units (CPUs) with access to a memory 105. VM memory 142 may be carved out of memory 105. Processors 103 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. Processors 103 execute computer-executable process steps and interfaces with interconnects (not shown) for example, a system bus, a Peripheral Component Interconnect (PCI) bus (or PCI-Express (PCIe) bus), a HyperTransport or industry standard architecture bus, a small computer system interface (SCSI) bus, a universal serial bus (USB), an Institute of Electrical and Electronics Engineers (IEEE) standard 1394 bus (sometimes referred to as "Firewire"), or any other interconnect type. Processor 103 executes a guest operating system for each VM. The guest operating system may be Windows based, Linux operating system, Solaris, or any other operating system type (without derogation of any third party trademark rights). The various aspects disclosed herein are not limited to any particular operating system type.

Processor 103 also executes one or more applications within each VM for performing certain functions. For example, an application may be an email program, a database application or any other application type. The various adaptive aspects of the present disclosure are not limited to any specific application or application type.

Host system 102A may further include one or more storage devices 107, which may be for example a hard disk, a CD-ROM, a non-volatile memory device or any other mass storage device type. Storage devices 107 may store guest operating system program files, application program files, and other files. Some of these files are stored using an installation program. The various aspects of the present disclosure are not limited to any specific storage device type.

Memory 105 may include random access main memory (RAM). When executing stored computer-executable process steps from storage devices 107, processor 103 may store and execute the process steps out of RAM. Read only memory (ROM, not shown) may also be used to store invariant instruction sequences, such as start-up instruction sequences or basic input/output system (BIOS) sequences. In one aspect, memory 105 stores a dirty pages list (or data structure) 152 that is described below, a PF (physical function) driver 112, and other instructions 113.

Host system 102A also includes other devices and interfaces, which may include a display device interface, a keyboard interface, a pointing device interface, etc. Details regarding the other devices are not germane to the aspects disclosed herein.

In one aspect, host systems 102A executes a virtual machine monitor (VMM) 110, for example, a processor executed, Hyper-V layer provided by Microsoft Corporation of Redmond, Wash., a Hypervisor layer, provided by VMWare Inc., or any other type. VMM 110 presents and manages the plurality of VMs 104 as well as the hardware resources that are used by the VMs 104 in a virtualized computing environment. Instructions for VMM 110 may be stored at memory 105 and executed by processor 103. It is noteworthy that VMM 110 may be executed by a separate computing device, i.e. separate from host system 102A.

System 100 may also include a management console 123 that includes one or more processor(s) 116 configured as central processing units (CPUs). In certain aspects, the processors 116 execute software instructions stored in memory 118 including a management application 121. Processor 116 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. In one aspect, processor 116 accesses memory 118 using a bus system (not shown), for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type. Of course, the various adaptive aspects of the present disclosure are not limited to any specific bus or interconnect type.

Memory 118 represents any form of random access memory (RAM), read-only memory (ROM), flash memory, or the like, or a combination of such devices. In one aspect, memory 118 is the main memory of the management console 123 used to execute the management application 121. The management application 121 may be used to interface with VMM 110 and configure host systems 102 including the VMs 104.

Processor 116 also has access to storage 120 that may be, or may include any conventional medium for storing large volumes of data in a non-volatile manner, such as one or more magnetic or optical based disks, solid state drives or any other storage media. The adaptive aspects described herein are not limited to any specific type of storage medium.

In one aspect, VMM 110 interfaces with the PF driver 112 to interact and communicate with an adapter 122 via an adapter interface 114 and interconnect 115. The adapter interface 114 communicates with the host interface 134 of adapter 122. Both the adapter interface 114 and the host interface 134 include logic and circuitry to send and receive information. In one aspect, interconnect or link 115 is a PCI-Express link. In one aspect, host interface 134 may be a PCI Express interface having logic/circuitry for sending and receiving PCI-Express packets to VMM 110.

In one aspect, adapter 122 is a network interface card (NIC) that communicates with other network devices (not shown) via ports 132A-132N (referred to as port 132 or ports 132) using network links 133A-133N (may be referred to as network link or network links 133). In another aspect, adapter 122 is a converged network adapter that is configured to handle both network and storage traffic. In yet another aspect, adapter 122 may be a remote direct memory access (RDMA) NIC, a host channel adapter or any other adapter type. The various aspects described herein are not limited to any specific adapter type.

Various network and storage protocols may be used to handle network and storage traffic, for example, Ethernet, Fibre Channel, Fibre Channel over Ethernet and others (e.g. InfiniBand). The adaptive aspects described herein are not limited to any specific network and/or storage protocol.

Adapter 122 may include a processor 124, respectively that executes firmware instructions (or logic, used interchangeably throughout the specification) 127 out of memory 126 to control overall adapter operations and execute the process steps described below. Adapter 122 may also include storage (not shown), which may be for example non-volatile memory, such as flash memory, or any other storage device. The storage may be used to store executable instructions and operating parameters that can be used for controlling adapter operations.

Adapter 122 further includes one or more transmit modules 140 for transmitting information via the network links 133A-133N. The transmit module 140 may maintain one or more transmit queues for temporarily storing packets before they are transmitted to other network devices.

Adapter 122 also includes one or more receive modules 130 for processing packets that are received by one or more ports 132 from other networked, computing devices via the network links 133. Receive module 130 may also maintains receive queues for staging received packets before they are provided to the VMs 104. Ports 132 include logic and circuitry for receiving and transmitting information. The logic and circuitry will depend on the protocols and standards that are used for network transmission. The adaptive aspects described herein are not limited to any specific protocol or standard.

Adapter 122 may also include one or more direct memory access (DMA) modules 128 that are used to manage access to link 115 via the host interface 134. The DMA modules 128 use a plurality of DMA channels (not shown) for sending and retrieving data using link 115. The DMA channels are typically used to move control structures and data between VM memory and the adapter memory 126, respectively.

Adapter 122 includes physical logic (or resources) 136 that may be exposed as multiple virtual functions (VFs) 138A-138N (may be referred to as VF or VFs 138). A VF is assigned to a VM and the VM may use multiple VFs. The term physical logic as used herein includes any and/or all resources of adapter 122 for receiving and transmitting network packets. The VMs 104 use VF drivers 106A-106N to directly access resources of adapter 122 via VFs 138, bypassing VMM 110.

In the virtualized environment of FIG. 1A, single root input/output virtualization (SR-IOV) is a specification that enables isolation of PCI-Express resources (for example, adapter 122) for manageability and performance reasons. Using SR-IOV, adapter 122 may be accessed directly by VMs 104 via the VF drivers' 106, instead of going through VMM 110.

SR-IOV has challenges when a source VM (for example, 104A) is migrated from one computing device (i.e. a source machine, e.g. 102A) to another computing device (i.e. a destination machine, e.g. 102N) because it is difficult for VMM 110 to track a VM memory since the VM memory is written directly by adapter 122, without intervention by VMM 110 and without going through a host memory-management-unit that may assist with dirty page tracking.

The various aspects of the present disclosure described herein provide efficient techniques to track VM memory, when the VM memory is written directly by adapter 122 via a DMA operation. The VM memory is typically written to post data that is received by adapter 122 as well as completion messages for transmit and receive operations. When a VM memory is written by adapter 122 it is referred to as a "dirty page". Before describing the details of how dirty pages are tracked, the following describes the relationship between virtual memory and physical memory with respect to FIG. 1B.

Figure 1B:
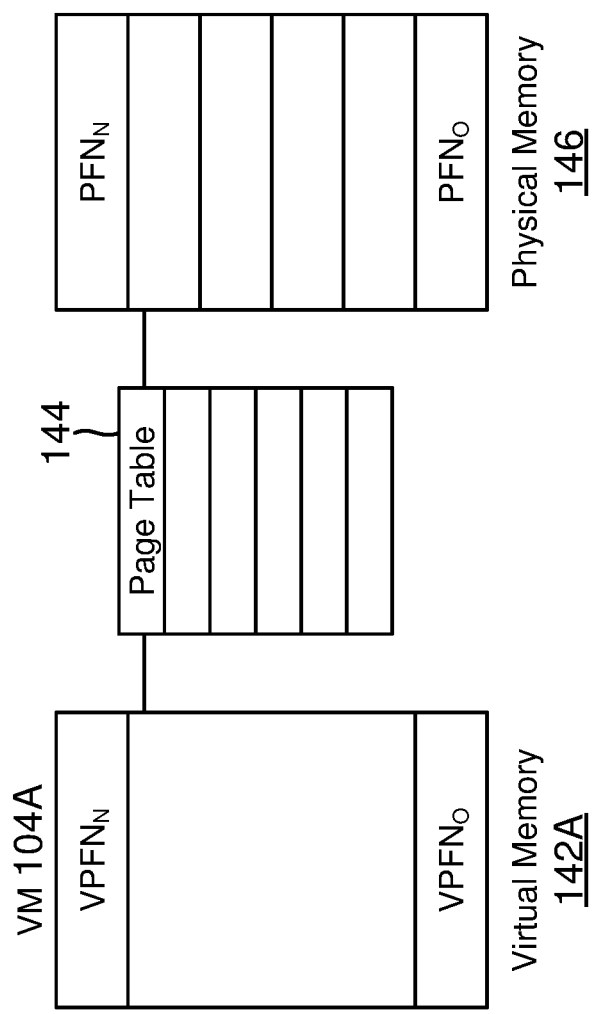
FIG. 1B shows an example of a layout for using virtual memory by a virtual machine (VM), according to one aspect of the present disclosure.

FIG. 1B shows the VM memory 142A assigned to VM 104A or any process executed by VM 104A. In a virtual memory system all addresses are virtual addresses that are converted into physical addresses by a processor based on information held in a set of tables maintained by the VMM 110. To make this translation, typically virtual and physical memory is divided into chunks that may be referred to as "pages". These pages may be the same size and each page is given a unique number i.e. a page frame number (PFN). In this paged model, a virtual address is composed of two parts; an offset and a virtual page frame number (VPFN). For example, if the page size is 4 Kbytes, then certain bits of a virtual address contain the offset and the VPFN. The VPFN is translated by using one or more page tables 144 that map virtual pages into physical pages in a physical memory 146 (similar to memory 105 of VMM 110, described above with respect to FIG. 1A). The physical memory page frame numbers are shown as PFN.

Figure 1C:
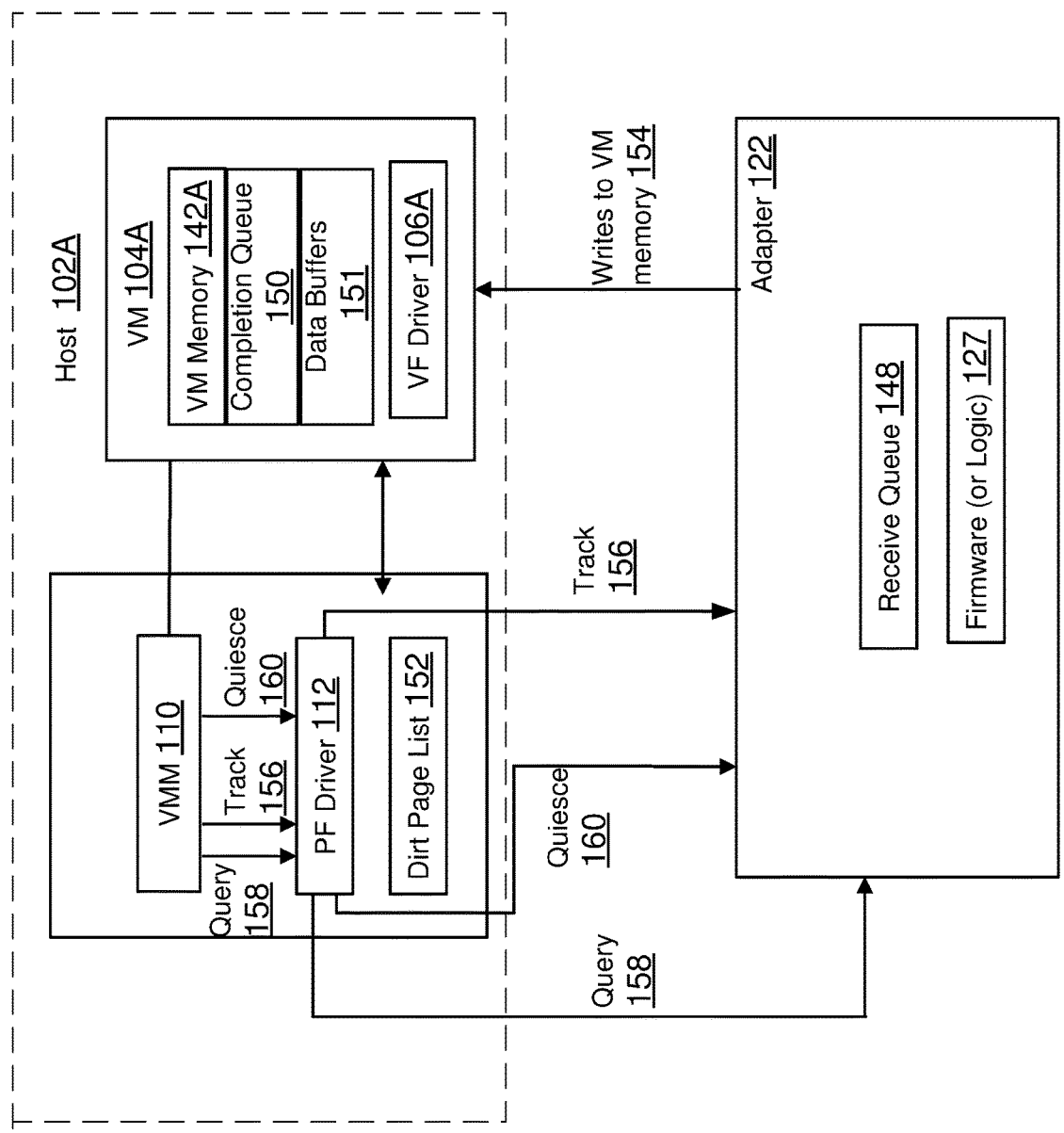
FIG. 1C shows a block diagram of tracking writes to a virtual memory by an adapter, according to one aspect of the present disclosure.

VM Memory Tracking by Adapter 122: FIG. 1C shows an example of tracking VM memory 142A writes by adapter 122, according to one aspect of the present disclosure. When a packet is received by adapter 122, the packet is first saved at a receive queue 148. The receive queue may be part of the receive module 130. The received packets are then written to data buffers 151 of VM memory 142A, shown as 154. The packets are transferred using a DMA operation by DMA module 128. A completion is then posted at a completion queue 150. A completion received by the adapter 122 for a transmit request may also be saved at the completion queue 150. It is noteworthy that separate completion queues for receive and transmit operations may be maintained. Furthermore, although the completion queues 150 are shown as part of VM memory 142A, the completion queues may be located at any other location. The adaptive aspects of the present disclosure are not limited to any specific location of the completion queues.

To start tracking write operations, VMM 110 sends a track command 156 to the PF driver 112. The PF driver 112 instructs the adapter 122 to start tracking writes to VM memory 142A. The adapter 122 initializes the dirty page list 152 at host memory 105 to track VM memory 142A pages that are modified by the adapter 122.

While memory writes at VM memory 142A are being tracked by adapter 122, the PF driver 112 may also forward a "query" command 158 that it receives from VMM 110 to get a list of dirty pages. VMM 110 uses the list of dirty pages to copy pages from a source machine to a destination machine during migration. The adapter 122 provides the list of dirty pages 152. After the dirty page list 152 is provided, a new list is started. In one aspect, the dirty pages list 152 is logically a new list from a previous list. A pointer indicates to a last dirty page that has been reported and next time, a report is provided from the pointer to the last dirty page. In one aspect, VMM 110 may send multiple query commands 158 during the migration process. For a first query command, the dirty pages list 152 may be large. However, as the migration proceeds and more query commands are sent, the dirty page list 152 is expected to become smaller. For example, after each iteration, a new dirty pages list is started after a list has already been provided in response to the query command. Furthermore, the duration between each query command is also expected to decrease. In one aspect, adapter 122 maintains a list of recently accessed pages (not shown) of the VM memory 142A to reduce repetition of writing a same dirty page multiple times by the adapter via the interconnect 115.

To stop writes to VM memory 142, the VMM 110 sends a "quiesce" command 160 to the PF driver 112. The quiesce command 160 is then sent to the adapter 122 by the PF driver 112. In response, the adapter 122 stops writing to the VM memory 142A and also stops tracking at a source VM (e.g. 104A). The quiesce command 160 may include an implicit "query" request for the dirty pages list 152 that is obtained by the PF driver 112 from the adapter 122. Thereafter, the PF driver 112 delivers a final dirty page list to VMM 110, marking the end of the migration process. It is noteworthy that VMM 110 may send a separate query request 158 after sending the quiesce command 160 to PF driver 112 for the list of dirty pages. Details of tracking VM memory 142A writes by adapter 122 are provided below with respect to FIG. 3.

To pass the dirty page list 152 from PF driver 112 to VMM 110, memory may be allocated by VMM 110, or the PF driver 112, as described below. When memory is allocated by VMM 110, the memory size may be fixed and the track and query calls will include a pointer to a memory location where VMM 110 desires the dirty page list 152. The number of pages within the dirty page list 152 is indicated in completion of query and quiesce requests.

When the PF driver 112 assigns memory for the dirty page list 152, the memory size may be increased, as needed, and a completion of the query and quiesce calls includes a number of pages (or elements) within the list and a pointer to a memory location where the dirty pages list 152 is stored.

In one aspect, the structure of the dirty page list 152 may vary and may include a pool of pages, a contiguous chunk of memory, multiple pages that may be linked to each other or any other structure. The adaptive aspects of the present disclosure are not limited to any specific structure of the dirty pages list 152.

Figure 1D:
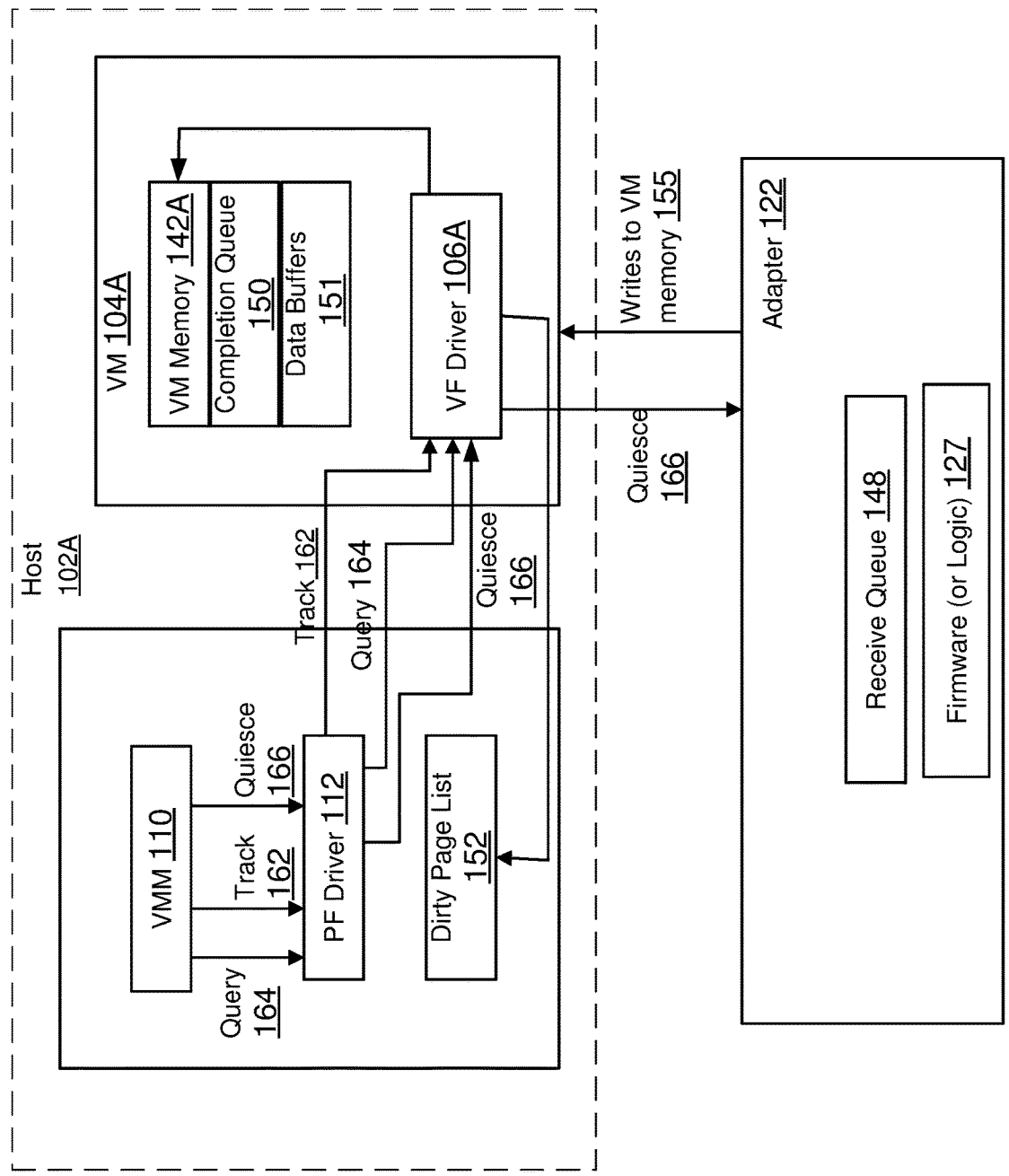
FIG. 1D shows a block diagram of tracking writes to a virtual memory by a virtual function driver, according to one aspect of the present disclosure.

VM Memory Tracking by VF Driver: FIG. 1D shows a system where the VF driver 106A tracks the writes to VM memory 142A, shown as 155. The track command 162, the query command 164 and the quiesce command 166 perform the same function as described above with respect to FIG. 1C, except in this case, the dirty page list 152 is maintained and updated by the VF driver 106A, as described below in detail with respect to the process of FIG. 4. In one aspect, the quiesce command 166 may be sent by the PF driver 112 to the VF driver 106A and then to the adapter 122. In another aspect, the quiesce command 166 is sent by the PF driver 112 directly to the adapter 122. It is noteworthy that when the VF driver 106A performs the tracking, then the VF driver 106A also assigns the memory buffers to store the dirty page list 152. The memory size may be increased dynamically, on an as need basis by the VF driver 106A. In another aspect, memory buffers may be allocated by the PF driver 112 or VMM 110, even when the VF driver 106A tracks the writes to VM memory 142A.

Figure 2:
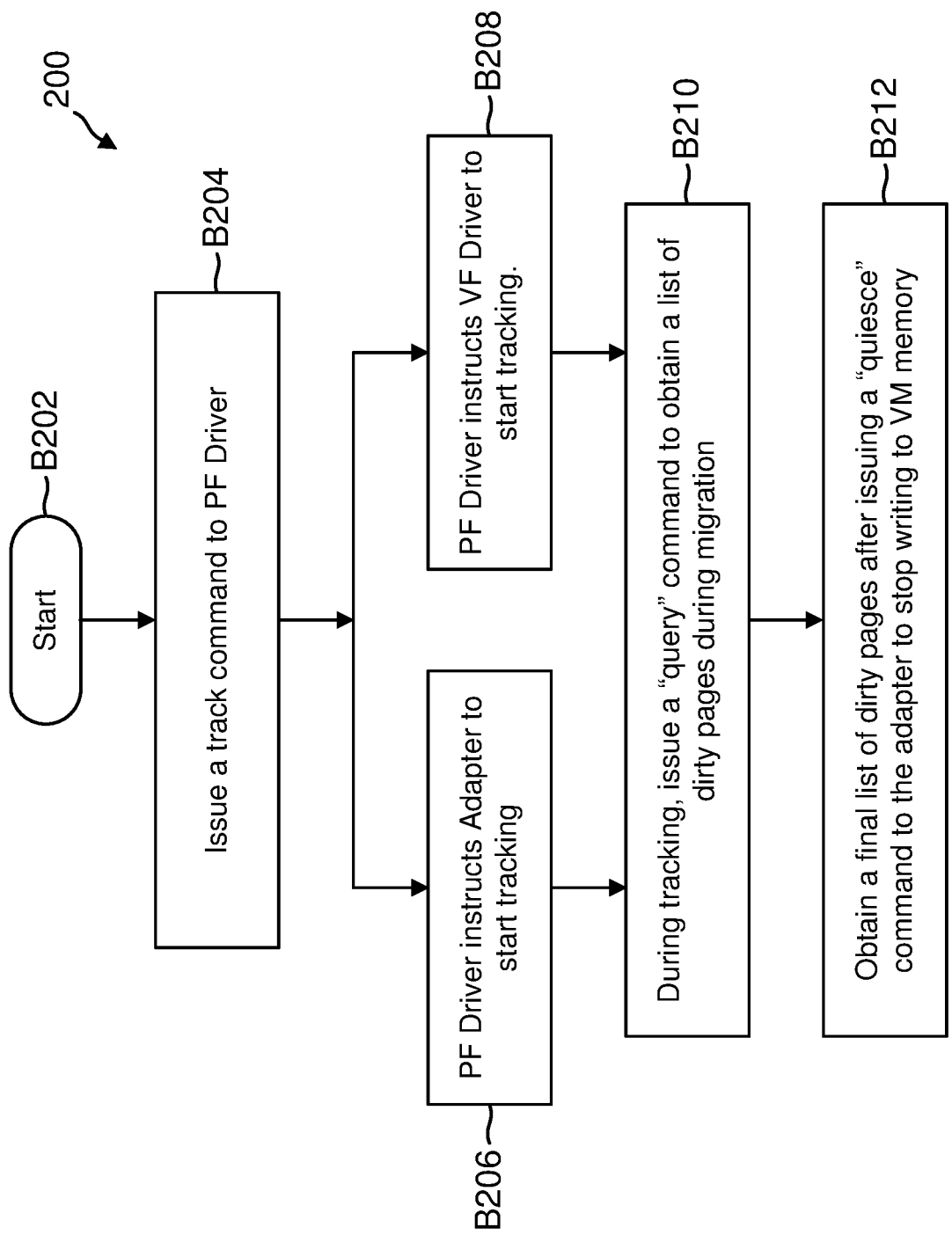
FIG. 2 shows an overall process flow for tracking writes to a virtual memory of a VM, according to one aspect of the present disclosure.
Figure 3:
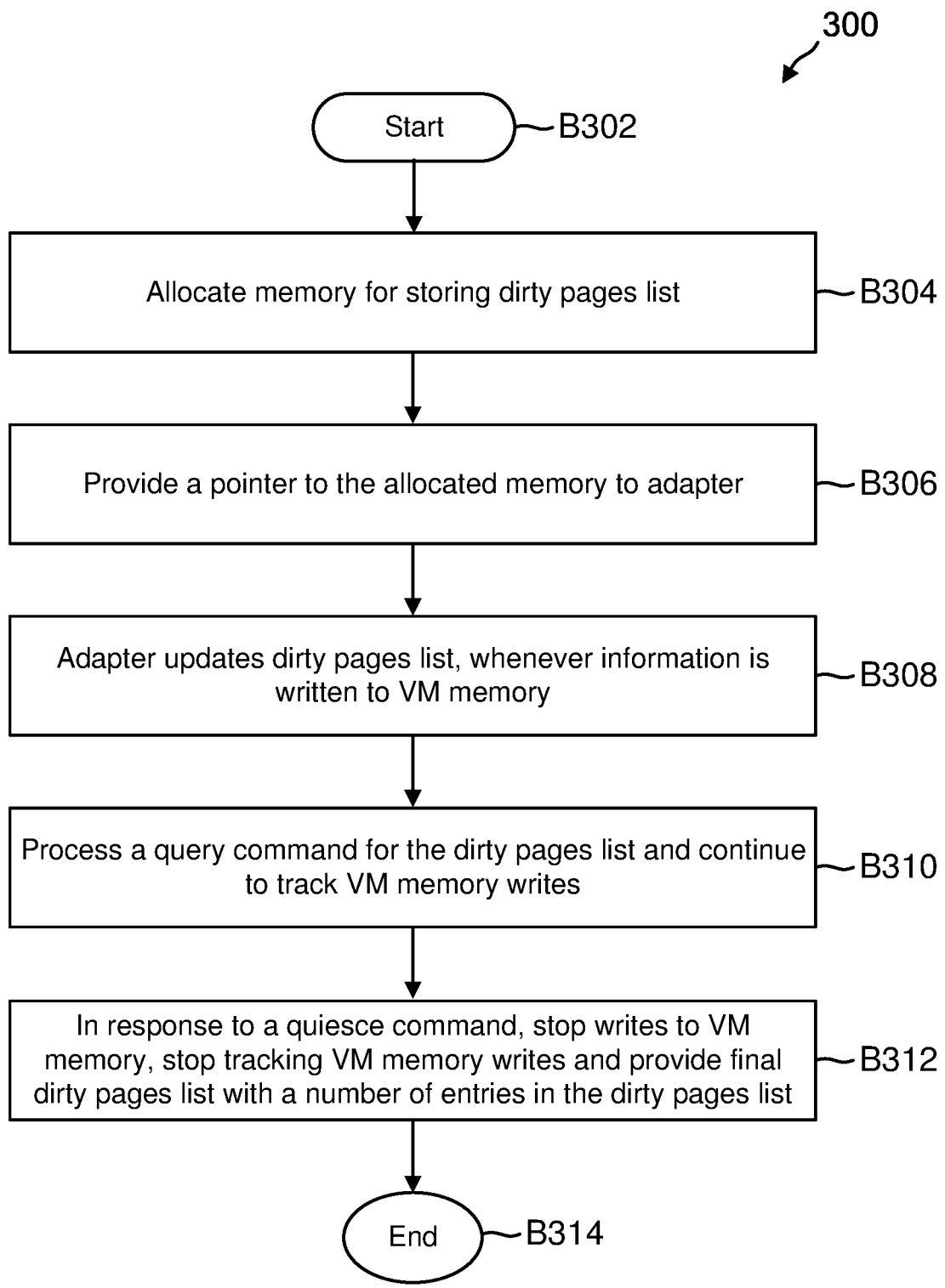
FIG. 3 shows a process flow for tracking writes to a virtual memory of a VM by an adapter, according to one aspect of the present disclosure.
Figure 4:
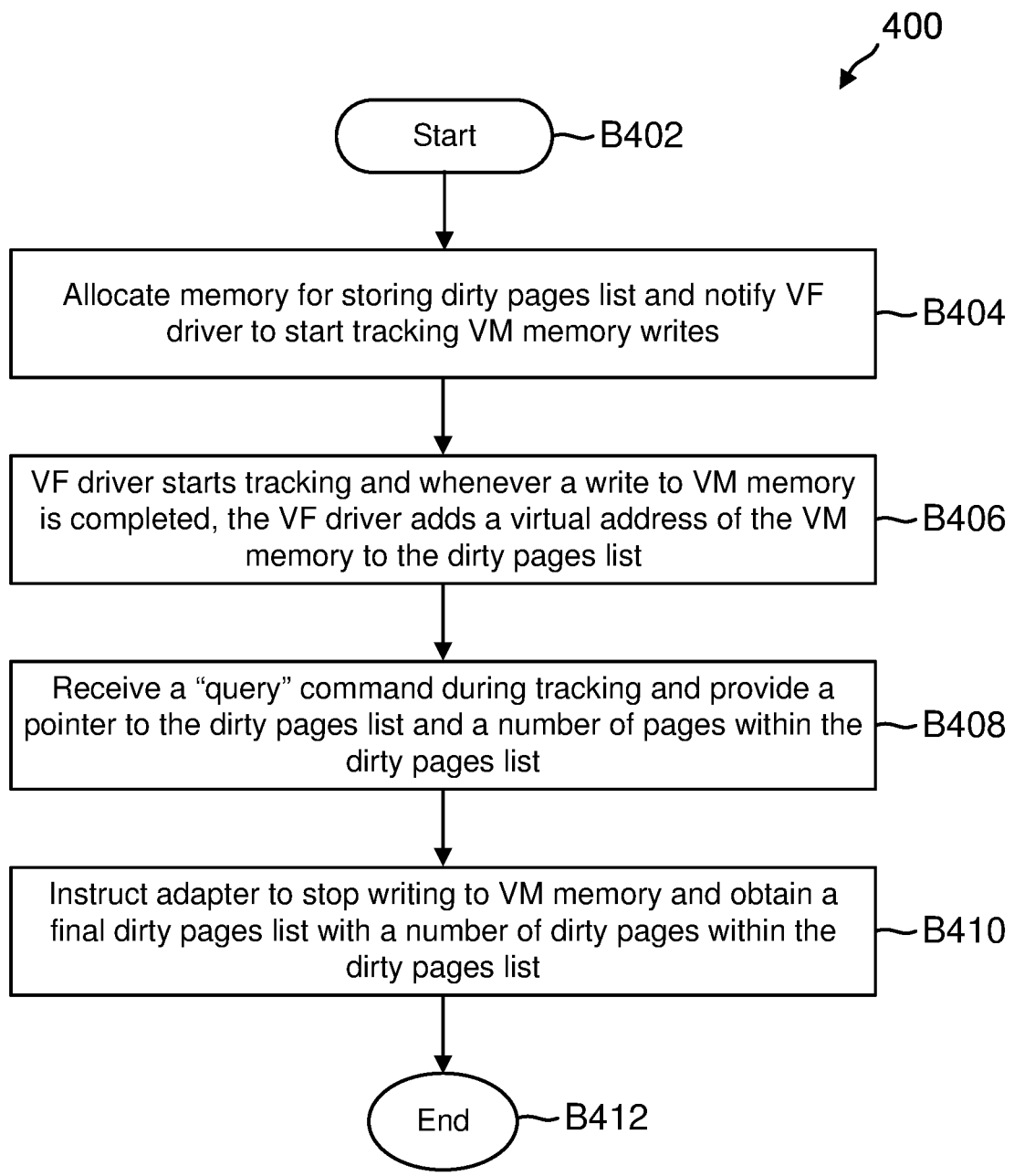
FIG. 4 shows a process flow for tracking writes to a virtual memory of a VM by a virtual function driver, according to one aspect of the present disclosure.

Process Flows: FIG. 2 shows an overall process 200 for tracking writes to VM 142A, according to one aspect of the present disclosure. The tracking starts in block B202 and may be executed as part of a migration process where a source VM (for example, 104A) is in the process of being migrated from a source machine (for example, 102A) to a destination machine (for example, 104N). As part of the migration process, in block B204, a "track" command is issued to the PF driver 112. The command may be issued by VMM 110 or any other entity. When the tracking is to be performed by adapter 122, the PF driver 112 instructs the adapter 122 to start tracking in block B206. When the tracking is to be performed by VF driver 106A, then the track command is sent to the VF driver 106A in block B208. Details of process B206 are shown in FIG. 3 and described below. Details of process block B208 are shown in FIG. 4 and described below in detail.

During the migration process, a query command may be issued in block B210 by the PF driver 112, either to the adapter 122 or the VF driver 106A to periodically obtain the dirty page list 152. This ensures that as the migration proceeds, and as described above, the dirty page list 152 continues to shrink.

The tracking process ends in block B212, when a quiesce command is issued by the PF driver 112 to the VF driver 106A that sends the command to the adapter 122 to end the tracking process and stop writes to VM memory 142A. In another aspect, the quiesce command is sent by the PF driver 122 directly to the adapter 122. A final version of the dirty pages list 152 is obtained either from the adapter 122 or the VF driver 106A, based on which entity was instructed to track writes to VM memory 142A. Furthermore, to obtain the final dirty page list 152, a separate query command may be issued in addition to the quiesce command.

FIG. 3 shows a process 300 for tracking VM memory writes by adapter 122, according to one aspect of the present disclosure. The process begins in block B302, when the migration of a source VM (e.g. 104A) has been initiated by VMM 110 or any other entity.

In block B304, PF driver 112 allocates memory for storing the dirty page list 152. This memory is mapped by the PF driver 112 for DMA operations by adapter 122 using the DMA module 128. Based on a request from VMM 110, the PF driver 112 also instructs the adapter 122 to start tracking the VM memory 152 writes in block B306. A pointer to the memory allocated for the dirty pages list 152 is provided to the adapter 122. This initializes a tracking state for adapter 122.

In block B308, adapter 122 updates VM memory 142A when data is written at the VM memory 142A, using one or more DMA operations. The adapter 122 initiates a write to VM memory 142A over the host interface 134 and also executes a write (may be referred to as "dirty-page write") operation using the host interface 134 to update the dirty pages list 152. The dirty-page write adds the address of the VM memory 142A page where the adapter 122 wrote the data. In one aspect, adapter 122 updates the dirty pages list 152 after every write operation. In another aspect, instead of updating the dirty list 152 after each write operation, adapter 122 coalesces multiple dirty-page write operations for a same dirty page and then executes the update operation once. For coalescing the multiple dirty-page writes (i.e. updates), adapter 122 maintains the state of a last reported page and then uses the state to update the dirty pages list 152 only once for multiple back-to-back writes to the same page. In one aspect, the adapter 122 tracks the state for a plurality of pages for coalescing dirty-page writes. The state for the pages may be maintained at memory 126 or any other location accessible to adapter 122. In yet another aspect, the adapter dynamically tracks accesses to a subset of the VM memory 142A, while another subset that is frequently accessed is not dynamically tracked and instead reported as being dirty in response to a quiesce command, described below in detail. In yet another aspect, the adapter 122 maintains a list of recently accessed pages of the VM memory 142A to reduce repetition of writing a same dirty page multiple times by the adapter 122 via the interconnect 115 (e.g. a PCI-Express bus).

During tracking, if the memory for the dirty pages list 152 becomes full, then the adapter 122 may discard a received packet to avoid non-reported modified pages (or may send flow control messages to a peer, network device to avoid packet drops). In another aspect, adapter 122 tracks the memory usage for the dirty pages list 152 and requests more memory from the PF driver 112, when it anticipates that the memory for the dirty pages list 152 is likely to become full.

When there are control structures in host memory 105, e.g. a completion queue that the adapter 122 writes to at a high rate and the number of memory pages involved is relatively low, then the adapter 122 may choose not to dynamically track each write to the control structures. This simplifies overall page tracking and avoids frequent updates when adapter 122 updates control structures. In this aspect, the pages of the entire control structure are reported by the adapter 122 as dirty. It is noteworthy that these pages involving control structures are reported as dirty in the "final list" of dirty pages provided after the quiesce command, as described below.

In block B310, PF driver 112 may query the adapter 122 for the dirty pages list 152. The adapter 122 responds with a number of entries within the dirty pages list. The PF driver 112 reports the dirty pages list 152 to VMM 110 and the adapter 122 continues to track the VM memory 152 regardless of the query command from the PF driver 112. In one aspect, the position of the last page that was reported is maintained such that the same last page is not reported in the next query command. When the query request is received, then the last position is detected (e.g. by a pointer) and then the entries that were not reported are reported to VMM 110. This is efficient because the same dirty pages list 152 entries are not reported multiple times. In another aspect, instead of the pointer, a new list is started after a previous list has been reported. In another aspect, the PF driver 112 simply reports a dirty pages list that has been previously reported by the adapter 122. In yet another aspect, the adapter maintains a list (not shown) of recently accessed pages to reduce the number of times the same page is reported.

In block B312, in response to a quiesce command generated by VMM 110, the PF driver 112 forwards the quiesce command to the adapter 122. The adapter 122 stops writing to the VM memory 142. The adapter 122 also completes reporting all the dirty pages (if there were dirty pages that were not reported yet). The adapter 122 also reports pages of any control structures that were modified or that could potentially be modified.

In one aspect, to obtain a final list of dirty pages after a quiesce command, the adapter 122 also guarantees that there are no dirty pages that were not reported due to coalescing, described above with respect to block B308. It is noteworthy, as an example, the dirty pages information can be transferred via the host interface 134 with a single write operation reporting multiple different dirty pages. The tracking process then ends in block B314.

FIG. 4 shows a process 400 for tracking VM memory 142A by the VF driver 106A, according to one aspect of the present disclosure. The process begins in block B402, when the PF driver 112 receives a request from the VMM 110 to track writes to VM memory 142A. In block B404, the PF driver 112 notifies the VF driver 106A to start tracking writes to VM memory 142. The VF driver 106A then allocates memory for the dirty pages list 152. This enables the VF driver 106A to dynamically increase the size of the allocated memory. To guarantee the tracking, the VF driver 106A communicates with other process VF driver 106A related threads that may be posting completions for writes to VM memory 142A. In another aspect, as an example, the PF driver 112 or VMM may allocate the memory and pass a pointer to the VF driver 106A.

Thereafter, the VM memory 142A write tracking begins in block B406. When the VF driver 106A processes a completion for a write operation involving the VM memory 142A, the VF driver 106A also adds the virtual address of the VM memory 142A that the adapter 122 accessed as reported by a processed completion element, to the dirty pages list 152. In one aspect, when the memory for the dirty pages list 152 becomes full, then the VF driver 106A dynamically allocates additional memory and avoids dropping any packets. In yet another aspect, the VF driver 106A dynamically tracks accesses to a subset of the VM memory 142A, while another subset that is frequently accessed is not dynamically tracked and instead reported as being dirty in response to a quiesce command, described below in detail. The VF driver tracks the writes to the VM memory 142A as part of processing completion elements that the adapter 122 writes to the completion queue 150.

During tracking, in block B408, VMM 110 may initiate one or more query commands and send the query command(s) to the PF driver 112. The PF driver 112 forwards the one or more query commands to the VF driver 106A. The VF driver 106A continues to track the writes to VM memory 142A and provides a pointer to the dirty pages list 152 with a total number of entries in the list. The PF driver 112 accesses the dirty pages list 152 and provides the list to the VMM 121 or any other entity that may have requested the list. In one aspect, the position of the last page that was reported is maintained such that the same last page is not reported in a next query command. When the query request is received, then the last position is detected (e.g. by a pointer) and then the entries that were not reported are reported to VMM 110. This is efficient because the same dirty pages list 152 entries are not reported multiple times, which saves processing time.

In block B410, the PF driver 112 instructs the adapter 122 to stop writing to the VM memory 152, in response to a quiesce command from VMM 110. The adapter 122 stops writing to VM memory 142A and indicates that to the VF driver 106A. The PF driver 112 also requests the VF driver 106A for a pointer to the dirty pages list 152. The PF driver 112 request may be in response to the quiesce command or a separate query request generated by VMM 110. The adaptive aspects are not limited to any sequence of commands, i.e. whether a quiesce includes the query or a separate query command. VF driver 106A first waits for the indication from the adapter 122 that it stopped writing to VM memory 142A. The VF driver 106A provides a pointer to the dirty pages list 152 with a number of entries in the dirty pages list 152. If there are control structures that the adapter 122 writes to but were not dynamically tracked, then all pages for the control structures are also reported. The PF driver 112 may copy the dirty pages list 152 and provides it to the VMM 110 or passes a pointer to VMM 110 so that it can access the dirty pages list 152 location. Thereafter, the process ends in block B410.

In one aspect, the systems and processes described herein enable VM migration in a SR-IOV environment. When the adapter 122 tracks VM memory writes, it saves computing resources of the VMM and host systems.

In another aspect, the technology disclosed herein has advantages compared to an alternative approach where the VMM 110 may track dirty pages, when adapter 122 directly accesses these pages operating as an SR-IOV adapter. For example, VMM 110 does not need to have computer code that is dependent on specific, adapter 122 hardware. Furthermore, VMM 110 does not have to constantly poll for dirty pages that are subject to memory race conditions and may consume significant host 102A resources.

In one aspect, methods and systems for a virtual machine environment are provided. In one aspect, one method includes allocating a memory for storing a dirty pages data structure for tracking writes to a virtual machine memory by an adapter coupled to a computing device and shared by a plurality of virtual machines; initiating a tracking operation by the adapter to track writes to the virtual memory; maintaining the dirty pages data structure while tracking the writes to the virtual memory; detecting a last entry of the dirty pages data structure that was reported by the adapter in response to a query command; providing access to the dirty pages data structure from the detected last entry in response to a next query command, while the adapter continues to track writes to the virtual machine memory; and providing a number of dirty pages within the dirty pages data structure and a pointer to the dirty pages data structure by the adapter, when the adapter is instructed to stop tracking writes to the virtual machine memory.

In another aspect, another method is provided. The method includes allocating a memory for storing a dirty pages data structure by a virtual function driver for tracking writes to a virtual machine memory; initiating a tracking operation by a virtual function driver executed by the virtual machine to access a physical resource; maintaining the dirty pages data structure while tracking the writes to the virtual memory by the virtual function driver; detecting a last entry of the dirty pages data structure that was reported by in response to a query command; providing access to the dirty pages data structure from the detected last entry in response to a next query command by the virtual function driver, while the virtual function driver continues to track writes to the virtual machine memory; and providing a number of dirty pages within the dirty pages data structure and a pointer to the dirty pages data structure, when the virtual function driver is instructed to stop tracking writes to the virtual machine memory.

The above description presents the best mode contemplated for carrying out the present aspects, and of the manner and process of making and using them, in such full, clear, concise, and exact terms as to enable any person skilled in the art to which they pertain to make and use these aspects. These aspects are, however, susceptible to modifications and alternate constructions from that discussed above that are fully equivalent. For example, the aspects disclosed herein are applicable to any peripheral device and are not limited to any particular adapter type. Consequently, these aspects are not limited to the particular aspects disclosed. On the contrary, these aspects cover all modifications and alternate constructions coming within the spirit and scope of the aspects as generally expressed by the following claims, which particularly point out and distinctly claim the subject matter of the aspects.

What is claimed is:

1. A method comprising:
   selecting, by a processor, a component to track writes to a virtual memory used by a virtual machine to write data to a storage device, during migration of the virtual machine from a source device to a destination device;
   updating, by the component, a data structure at a memory for tracking writes to the virtual memory;
   providing, by the component, a first list of dirty pages indicating data written using the virtual memory;
   detecting, by the component, a last entry in the first list of dirty pages;
   providing a second list of dirty pages by the component indicating data that was written to the virtual memory after the last entry;
   receiving, by the component an instruction to stop tracking writes to the virtual memory, and in response to the instruction, providing by the component access to the data structure indicating a number of dirty pages within the data structure.

2. The method of claim 1, further comprising: instructing the component by a physical function driver to track writes to the virtual memory.

3. The method of claim 2, further comprising: receiving, by the physical function driver, a quiesce command, and in response, instructing the component to stop tracking writes to the virtual memory.

4. The method of claim 2, further comprising: allocating, by the physical function driver, storage space for the memory to store the data structure, in response to a request from the component when the component detects that the memory is likely to become full.

5. The method of claim 1, wherein the component is a device interfacing with the processor to write the data to the storage device.

6. The method of claim 1, wherein the component is a virtual function driver used by the virtual machine to access a physical resource of the source device.

7. The method of claim 6, further comprising: dynamically tracking writes to a first subset of the virtual memory by the virtual function driver; and reporting, by the virtual function driver, a second subset of the virtual memory as dirty, upon receiving instruction to stop tracking writes to the virtual memory.

8. The method of claim 6, further comprising: detecting, by the virtual function driver, that memory is likely to become full; and allocating, by the virtual function driver, storage space for the data structure.

9. A non-transitory machine-readable medium having stored thereon instructions comprising machine executable code, which when executed by a machine, causes the machine to:
   select a component to track writes to a virtual memory used by a virtual machine to write data to a storage device, during migration of the virtual machine from a source device to a destination device;

update, by the component, a data structure at a memory for tracking writes to the virtual memory;

provide, by the component, in response to a first query request, a first list of dirty pages indicating data written using the virtual memory;

detect, by the component, a last entry in the first list of dirty pages;

provide, by the component, in response to a second query request, a second list of dirty pages indicating data that was written to the virtual memory after the last entry; and provide, by the component, access to the data structure indicating a number of dirty pages within the data structure, after the component is instructed to stop tracking writes to the virtual memory.

10. The non-transitory machine-readable medium of claim 9, wherein the machine executable code further causes the machine to: instruct the component by a physical function driver to track writes to the virtual memory.

11. The non-transitory machine-readable medium of claim 10, wherein the machine executable code further causes the machine to: instruct the component by the physical function driver to stop tracking writes to the virtual memory, in response to receiving a quiesce command by the physical function driver.

12. The non-transitory machine-readable medium of claim 10, wherein the machine executable code further causes the machine to: allocate, by the physical function driver, storage space for the memory to store the data structure, in response to a request from the component, when the component detects that the memory is likely to become full.

13. The non-transitory machine-readable medium of claim 9, wherein the component is a device interfacing with a processor of the source device to write the data to the storage device.

14. The non-transitory machine-readable medium of claim 9, wherein the component is a virtual function driver used by the virtual machine to access a physical resource of the source device.

15. The non-transitory machine-readable medium of claim 14, wherein the machine executable code further causes the machine to: dynamically track writes to a first subset of the virtual memory by the virtual function driver; and report, by the virtual function driver, a second subset of the virtual memory as dirty, upon receiving instruction to stop tracking writes to the virtual memory.

16. An apparatus, comprising:

a processor executing a virtual machine at a source device using a virtual memory to write data to a storage device;

a memory for storing a data structure for tracking writes to a virtual memory used by the virtual machine to write data to a storage device; and a component executed by the processor to:
track writes to the virtual memory using the data structure stored at the memory, during migration of the virtual machine from the source device to a destination device;

update the data structure;

provide, in response to a first query request, a first list of dirty pages indicating data written using the virtual memory;

detect a last entry in the first list of dirty pages;

provide, in response to a second query request, a second list of dirty pages that was written to the virtual memory after the last entry; and provide access to the data structure indicating a number of dirty pages within the data structure, after being instructed to stop tracking writes to the virtual memory.

17. The apparatus of claim 16, wherein the component is a device interfacing with the processor to write the data to the storage device.

18. The apparatus of claim 16, wherein the component is a virtual function driver used by the virtual machine to access a physical resource of the source device.

* * * * *